US010653958B2

(12) United States Patent
Iwamoto et al.

(10) Patent No.: US 10,653,958 B2
(45) Date of Patent: *May 19, 2020

(54) IMAGE PROCESSING PROGRAM AND IMAGE PROCESSING DEVICE FOR MOVING DISPLAY AREA

(71) Applicant: Nintendo Co., Ltd., Kyoto (JP)

(72) Inventors: Daiki Iwamoto, Kyoto (JP); Masahiro Nitta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,859

(22) Filed: Jan. 31, 2017

(65) Prior Publication Data
US 2017/0136359 A1 May 18, 2017

Related U.S. Application Data

(63) Continuation of application No. 14/491,562, filed on Sep. 19, 2014, now Pat. No. 9,592,447, which is a
(Continued)

(30) Foreign Application Priority Data

May 26, 2005 (JP) .................. 2005-154233

(51) Int. Cl.
A63F 13/5255 (2014.01)
A63F 13/2145 (2014.01)
(Continued)

(52) U.S. Cl.
CPC .......... A63F 13/5255 (2014.09); A63F 13/10 (2013.01); A63F 13/2145 (2014.09);
(Continued)

(58) Field of Classification Search
CPC .............. A63F 13/2145; A63F 13/5258; A63F 13/5255; G06F 3/0488
See application file for complete search history.

(56) References Cited

U.S. PATENT DOCUMENTS 4,602,251 A 7/1986 Sawada et al.
4,845,631 A 7/1989 Bottorf
(Continued)

FOREIGN PATENT DOCUMENTS

EP 0 640 905 A1 3/1995
JP 7-89734 A 4/1995
(Continued)

OTHER PUBLICATIONS

Kyung, Min-Ho, et al., "Through-the-Lens Camera Control with a Simple Jacobian," Proc. of Graphics Interface 1995, Quebec, Canada, May 19, 1995, XP002669554, pp. 171-178.
(Continued)

Primary Examiner — David L Lewis
Assistant Examiner — Robert E Mosser
(74) Attorney, Agent, or Firm — Nixon & Vanderhye, P.C.

(57) ABSTRACT

A video game device calculates a difference vector extending from a predetermined reference position on the screen to an input position. Moreover, the video game device calculates movement parameter data used for moving, with respect to a fixed point in the virtual space uniquely determined based on a position of the controlled object, the point of sight to a position that is determined by a direction in the virtual space based on a direction of the difference vector and a distance in the virtual space based on a magnitude of the difference vector. The point of sight is moved based on the movement parameter data. The video game device produces an image based on a virtual camera, which has
(Continued)

been moved according to the movement of the point of sight, and displays the image on the screen of a display device.

17 Claims, 12 Drawing Sheets

Related U.S. Application Data continuation of application No. 11/339,568, filed on Jan. 26, 2006, now Pat. No. 8,866,856.

(51) Int. Cl.
  *A63F 13/5258* (2014.01)
  *A63F 13/40* (2014.01)
  *G06T 19/00* (2011.01)
  *A63F 13/26* (2014.01)
  *A63F 13/92* (2014.01)

(52) U.S. Cl.
  CPC .......... *A63F 13/26* (2014.09); *A63F 13/5258* (2014.09); *A63F 13/92* (2014.09); *G06T 19/003* (2013.01); *A63F 2300/1075* (2013.01); *A63F 2300/301* (2013.01); *A63F 2300/6661* (2013.01); *A63F 2300/6676* (2013.01)

(56) References Cited

U.S. PATENT DOCUMENTS

| | | | |
|---|---|---|---|
| 5,485,174 | A | 1/1996 | Henshaw et al. |
| 5,592,195 | A | 1/1997 | Misono et al. |
| 6,256,047 | B1 | 7/2001 | Isobe et al. |
| 6,285,347 | B1 | 9/2001 | Watanabe et al. |
| 6,424,353 | B2 | 7/2002 | Yamamoto et al. |
| 2001/0049301 | A1 | 12/2001 | Masuda et al. |
| 2002/0011941 | A1 | 1/2002 | Endo et al. |
| 2002/0177944 | A1 | 11/2002 | Ihara et al. |
| 2003/0044081 | A1 | 3/2003 | Uesugi |
| 2004/0088727 | A1* | 5/2004 | Kamiya ................ G06F 3/0485 725/52 |
| 2004/0130525 | A1 | 7/2004 | Suchocki |
| 2005/0024238 | A1 | 2/2005 | Kimura |
| 2005/0051623 | A1 | 3/2005 | Okuda et al. |

FOREIGN PATENT DOCUMENTS

| | | | |
|---|---|---|---|
| JP | 7-121152 | A | 5/1995 |
| JP | 10-198270 | A | 7/1998 |
| JP | 11-7543 | A | 1/1999 |
| JP | 11-235466 | A | 8/1999 |
| JP | 2001-42026 | A | 2/2001 |
| JP | 2001-353358 | A | 12/2001 |
| JP | 2002-11243 | A | 1/2002 |
| JP | 2002-311823 | A | 10/2002 |
| JP | 2005-100199 | A | 4/2005 |

OTHER PUBLICATIONS

Zeleznik, Robert, et al., "UniCam—2D Gestural Camera Controls for 3D Environments," Proceedings of the 1999 Symposium on Interactive 3D Graphics, SI3D '99, New York, NY, Jan. 1, 1999, pp. 169-173.
Extended European Search Report dated Mar. 6, 2012, issued in EP Application No. 06002063.3.
Nintendo Official Player's Guide—Dairanto Smash Brothers DX (Super Smash Brothers Melee), Shogakukan Inc., Jan. 20, 2002, pp. 4-5, cover and bibliographic page.
"readme.text," Scorched 3D version 36.2; retrieved from the Internet: URL:http://www.gamershell.com/download.html?id=907&mirror=4&caat=demo&filename=Scorched3D-36.2zip&ts=1328804267&auth=to74vsw2, Jan. 24, 2004, XP002669223.
Scorched 3D Build 36.2 (full Game), gamer shell, retrieved from the Internet: URL:http://www.gamershell.com/download_907.shtml, Jan. 24, 2004, XP002670380.
Summons to attend oral proceedings pursuant to Rule 115(1) EPC dated Jul. 19, 2018, issued in related European Patent Application No. 06002063.3.

* cited by examiner

IMAGE PROCESSING PROGRAM AND IMAGE PROCESSING DEVICE FOR MOVING DISPLAY AREA

CROSS REFERENCE TO RELATED APPLICATIONS

This application is a continuation of U.S. patent application Ser. No. 14/491,562 filed Sep. 19, 2014; which is a continuation of U.S. patent application Ser. No. 11/339,568 filed Jan. 26, 2006, now U.S. Pat. No. 8,866,856; which claims priority from Japanese Patent Application No. 2005-154233 filed May 26, 2005. The disclosures of these prior applications are incorporated herein by reference.

BACKGROUND OF THE INVENTION

Field of the Invention

The present invention relates to an image processing program and an image processing device and, more particularly, to an image processing program and an image processing device, with which a portion of a virtual space to be displayed on the screen ("display area") can be moved.

Description of the Background Art

There are conventional video game devices and video game programs for displaying objects in a virtual space on the screen. For example, there is a video game in which there are objects (characters) in a three-dimensional virtual game space, wherein the display area is determined so that primary objects will be shown within the screen (see, for example, "Nintendo Official Player's Guide—Dairanto Smash Brothers DX (Super Smash Brothers Melee)", Shogakukan Inc., Jan. 20, 2002, p 4 (Non-Patent Document 1)). This is a fighting video game in which there are a plurality of characters, one of which is controlled by the player. The video game device automatically adjusts the position and the direction of a virtual camera so that the characters are shown within the screen. An image of the game space taken by the virtual camera is displayed on the screen. Thus, the player can enjoy the game without losing sight of the player character or the opponent character.

Depending on the nature of the video game, simply keeping all the primary objects within the screen may not always give the best view for the player. For example, in video games where the player character shoots an arrow or a gun in a certain direction in the game space, more of the area in that direction is preferably displayed on the screen. Specifically, in a case where the player character is to shoot an arrow in the upper right direction of the screen, the player character is preferably displayed closer to the lower left corner of the screen so that more of the area in the upper right direction from the player character is displayed on the screen. This does not apply only to those cases where the player controls the player character. In any case where the player performs an operation in a certain direction with reference to a point in the game space, it is preferable for the player that more of the area in that direction is displayed on the screen.

With the method of Non-Patent Document 1, however, the display area is determined based on a plurality of objects in the game space. Therefore, if there are no primary objects in a particular area in the game space, the displayed game space will not be centered about the particular area even if the player wishes to see the particular area. Thus, it is not possible with this method to display the game space on the screen in a preferred manner for the player in such a case where the player character shoots an arrow, for example.

SUMMARY OF THE INVENTION

Therefore, an object of the present invention is to provide an image processing program and an image processing device in which the user is allowed to freely adjust the display area of a virtual space.

The present invention has the following features to attain the objects mentioned above. Note that parenthetic expressions in the following section (reference numerals, supplementary explanations, etc.) are merely to indicate the correlation between what is described in the following section and what is described in the description of the preferred embodiments set out further below in the present specification, and are in no way intended to restrict the scope of the present invention.

A first aspect of the present invention is directed to a computer-readable storage medium storing an image processing program (video game program) to be executed by a computer (the CPU core 21, etc.) of an image processing device (the video game device 10) for displaying an image of a three-dimensional virtual space (game space) including an image of a controlled object (the player character 41) placed in the virtual space, which can be controlled by the user, by using a virtual camera whose position is determined based on a point of sight set in the virtual space. The image processing device includes an input device (the touch panel 15) for outputting an input position corresponding to a point on a screen of a display device (the second LCD 12) specified by the user. The image processing program instructs the computer to perform a position obtaining step (S13), a first calculation step (S15), a second calculation step (S19 and S20), a movement control step (S24) and a display control step (S6). In the position obtaining step, the computer obtains an input position (the point P3 shown in FIG. 9) outputted from the input device. In the first calculation step, the computer calculates a difference vector (the vector V1 shown in FIG. 9) extending from a predetermined reference position (the point P2 shown in FIG. 9) on the screen to the input position. In the second calculation step, the computer calculates movement parameter data (58) used for moving, with respect to a fixed point in the virtual space (the point p1 shown in FIG. 13) uniquely determined based on a position of the controlled object, the point of sight to a position that is determined by a direction in the virtual space based on a direction of the difference vector and a distance in the virtual space based on a magnitude of the difference vector (see FIG. 13). In the movement control step, the computer moves the point of sight based on the movement parameter data. In the display control step, the computer produces an image based on the virtual camera, which has been moved according to the movement of the point of sight, and displaying the image on the screen of display device.

According to a second aspect, in the second calculation step, position data representing a target point (the point p2 shown in FIG. 13) in the virtual space is calculated as the movement parameter data. The target point is determined, with respect to the fixed point, by a direction in the virtual space based on the direction of the difference vector and a distance in the virtual space based on the magnitude of the difference vector. In the movement control step, the point of sight is moved to the target point.

According to a third aspect, in the movement control step, the point of sight is moved so that the point of sight gradually approaches the target point.

According to a fourth aspect, in the second calculation step, the movement parameter data is calculated so that the controlled object will not be outside the screen after the point of sight is moved.

According to a fifth aspect, the image processing program instructs the computer to further perform a detection step (S12) of detecting whether there is no longer an input to the input device. In the second calculation step, the movement parameter data used for moving the point of sight to the fixed point is calculated when it is detected in the detection step that there is no longer an input.

A sixth aspect of the present invention is directed to a computer-readable storage medium storing an image processing program (video game program) to be executed by a computer (the CPU core 21, etc.) of an image processing device (the video game device 10) for displaying an image of a three-dimensional virtual space (game space) including an image of a controlled object (the player character 41) placed in the virtual space, which can be controlled by the user, by using a virtual camera whose position is determined based on a point of sight set in the virtual space. The image processing device includes an input device (the touch panel 15) for outputting an input position corresponding to a point on a screen of a display device (the second LCD 12) specified by the user. The image processing program instructs the computer to perform a position obtaining step (S13), a first calculation step (S15), a second calculation step (S19 and S20), a movement control step (S24) and a display control step (S6). In the position obtaining step, the computer obtains an input position (the point P3 shown in FIG. 9) outputted from the input device. In the first calculation step, the computer calculates a difference vector (the vector V1 shown in FIG. 9) extending from a predetermined reference position (the point P2 shown in FIG. 9) on the screen to the input position. In the second calculation step, the computer calculates movement parameter data (58) used for moving, with respect to a fixed point in the virtual space (the point p1 shown in FIG. 13) uniquely determined based on a position of the controlled object, the display area to a position that is determined by a direction in the virtual space based on a direction of the difference vector and a distance in the virtual space based on a magnitude of the difference vector. In the movement control step, the computer moves the display area based on the movement parameter data. In the display control step, the computer displays, on the display device, an image of the virtual space within the display area.

According to a seventh aspect, in the second calculation step, the movement parameter data is calculated as being position data representing a target point in the virtual space (the point p2 shown in FIG. 13) that is determined, with respect to the fixed point, by a direction in the virtual space based on the direction of the difference vector and a distance in the virtual space based on the magnitude of the difference vector. In the movement control step, the display area is moved so that a predetermined point in the display area coincides with the target point.

According to an eighth aspect, in the movement control step, the display area is moved so that the predetermined point in the display area gradually approaches the target point.

According to a ninth aspect, in the second calculation step, the movement parameter data is calculated so that the controlled object will not be outside the screen after the display area is moved to the target point.

According to a tenth aspect, the image processing program instructs the computer to further perform a detection step (S12) of detecting whether there is no longer an input to the input device. In the second calculation step, the movement parameter data used for moving the display area so that the fixed point is displayed at the reference position is calculated when it is detected in the detection step that there is no longer an input.

According to an eleventh aspect, the second calculation step includes a space vector calculation step (S19) and a target point setting step (S20). In the space vector calculation step, the computer calculates a space vector (the vector v1 shown in FIG. 13), being a vector in the virtual space, based on the difference vector. In the target point setting step, the computer sets the target point at a position of an end point of the space vector with respect to the fixed point. The space vector calculation step further includes a first correction step (S16 and S17) of correcting at least one of the difference vector and the space vector so that a magnitude of the space vector is less than or equal to a predetermined upper limit value.

According to a twelfth aspect, the second calculation step includes a space vector calculation step (S19) and a target point setting step (S20). In the space vector calculation step, the computer calculates a space vector, being a vector in the virtual space, based on the difference vector. In the target point setting step, the computer sets the target point at a position of an end point of the space vector with respect to the fixed point. In the space vector calculation step, a component of the space vector with respect to a first direction in the virtual space (the z-axis direction shown in FIG. 13) is calculated based on a component of the difference vector with respect to a third direction on the screen (the Y-axis direction shown in FIG. 13), and a component of the space vector with respect to a second direction perpendicular to the first direction (the x-axis direction shown in FIG. 13) is calculated based on a component of the difference vector with respect to a fourth direction perpendicular to the third direction (the X-axis direction shown in FIG. 13).

According to a thirteenth aspect, the virtual space has a predetermined plane (the ground 43) on which the controlled object can be moved. The virtual camera has a viewing direction being perpendicular to the second direction and with an angle of depression of less than 90° with respect to the predetermined plane. The third direction is parallel to a direction of a straight line displayed on the screen extending in the first direction through the point of sight. The space vector calculation step includes a second correction step of correcting at least one of the difference vector and the space vector so that a proportion of the component of the space vector in the second direction with respect to the component of the space vector in the first direction is greater than a proportion of the component of the difference vector in the fourth direction with respect to the component of the difference vector in the third direction.

The present invention may be carried out in the form of an image processing device having substantially the same function as that realized by executing an image processing program as set forth above.

According to the first or sixth aspect, the display area is moved according to the input position specified by the player. Thus, the player is allowed to move the display area by using a pointing device capable of detecting an input position on the screen. The difference vector used for determining the amount by which the display area is to be moved is calculated based on the reference position and the input position on the screen, whereby the magnitude thereof is limited. Therefore, the area across which the display area is moved can be limited to a predetermined area centered about the fixed point, whereby the display area will not be at a position far away from the fixed point. For example, if the fixed point is set at or near the position of the controlled object, the player can move the display area across an area centered about the controlled object.

According to the second or seventh aspect, by setting the target point, it is possible to easily move the display area according to the input position specified by the player, irrespective of the current position of the display area.

According to the third or eighth aspect, it is possible to prevent the abrupt movement of the display area, which may be difficult for the player to follow. The abrupt movement of the display area may seem to the player to be a switching of a virtual space image from one to another, which may be difficult for the player to follow. In contrast, according to the third or seventh aspect, the display area is moved gradually, whereby it is possible to display the game image in a preferred manner for the player without causing the player to feel like the game image is switched from one to another.

According to the fourth or ninth aspect, it is possible to keep the controlled object always displayed within the screen.

According to the fifth or tenth aspect, the player can easily bring the display back to the state where the fixed point is displayed at the reference position by discontinuing the input to the input device. Therefore, it is possible to improve the playability in moving the display area.

According to the eleventh aspect, the magnitude of the space vector used for setting the target point is limited to a value less than or equal to the upper limit value. Thus, if the upper limit value is set to an appropriate value, it is possible to keep the controlled object always displayed within the screen.

According to the twelfth aspect, the space vector can be calculated by a simple method based on the difference vector. This eliminates the need for a complicated calculation, such as the conversion from the two-dimensional screen coordinate system to the three-dimensional virtual space coordinate system, whereby it is possible to calculate the position of the target point with a small amount of calculation.

According to the thirteenth aspect, the virtual camera is set with an angle of depression of less than 90° with respect to the predetermined plane. If the proportion between the component of the space vector in the third direction and the component thereof in the fourth direction is the same as the proportion between the component of the difference vector in the first direction and the component thereof in the second direction, the player may feel awkward when the display area is moved. Specifically, the player may feel that the amount by which the display area is moved in the first direction of the screen is too small. In contrast, according to the eleventh aspect, it is possible to reduce such awkwardness that may be felt by the player by correcting the direction of the difference vector or the space vector.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
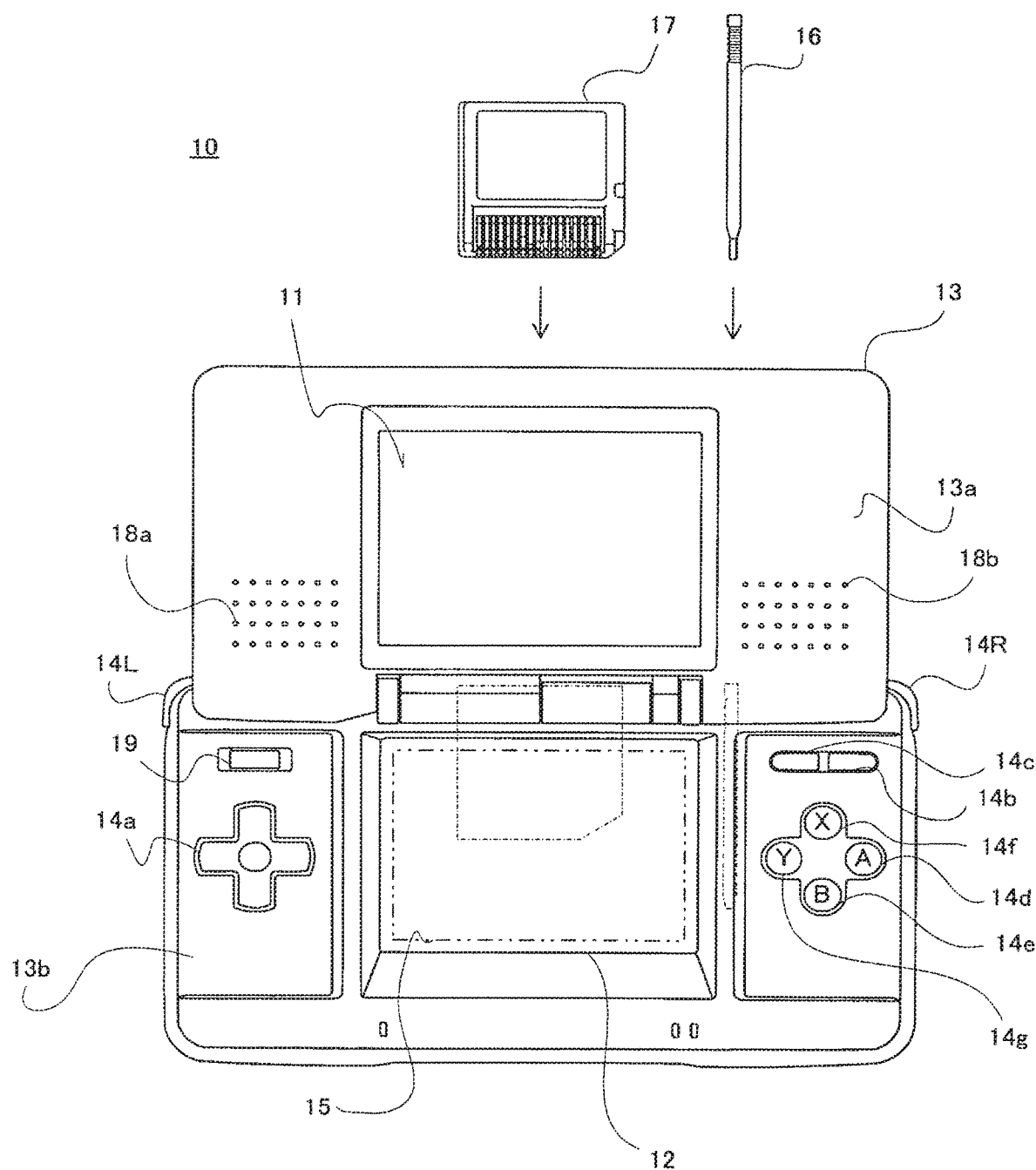
FIG. 1 generally shows a video game device according to an embodiment of the present invention.

An image processing program and an image processing device according to an embodiment of the present invention will now be described. First, a configuration of a portable video game device 10, being an example of an image processing device for executing an image processing program (video game program), will be described. FIG. 1 generally shows the video game device 10. Referring to FIG. 1, the video game device 10 includes a first LCD (Liquid Crystal Display) 11 and a second LCD 12. A housing 13 includes an upper housing 13a accommodating the first LCD 11, and a lower housing 13b accommodating the second LCD 12. The first LCD 11 and the second LCD 12 both have a resolution of 256×192 dots. While LCDs are used in the present embodiment, the display device may be of any other suitable type, e.g., an EL (Electro Luminescence) display device. Moreover, the resolution of the first LCD 11 and the second LCD 12 is not limited to the particular resolution used herein.

The upper housing 13a includes sound slits 18a and 18b therein for allowing the sound from a pair of speakers (30 in FIG. 2) to be described later to pass therethrough.

The lower housing 13b includes a set of input devices, including a cross-shaped switch 14a, a start switch 14b, a select switch 14c, an A button 14d, a B button 14e, an X button 14f, a Y button 14g, an L button 14L and an R button 14R. Another input device is a touch panel 15 attached on the screen of the second LCD 12 (as indicated by a two-dot chain line in FIG. 1). The lower housing 13b includes a power switch 19 and slots for accommodating a memory card 17 and a stylus 16 (as indicated by one-dot chain lines in FIG. 1).

The touch panel 15 may be any of various types of touch-sensitive panels, including a resistive film touch panel, an optical (infrared) touch panel and a capacitancecoupling touch panel. The touch panel 15 is capable of outputting position data corresponding to the contact point on the surface thereof, at which it is being touched with the stylus 16. The touch panel 15 outputs the position data by detecting the input position (input coordinates) specified by the player at a predetermined sampling interval. While it is assumed herein that the player uses the stylus 16 to operate the touch panel 15, it is understood that the touch panel 15 may be operated with a pen (stylus pen) or a fingertip instead of the stylus 16. In the present embodiment, the touch panel 15 has a resolution (detection precision) of 256×192 dots, which is equal to the resolution of the second LCD 12. Note however that it is not necessary that the resolution of the touch panel 15 is equal to that of the second LCD 12.

The memory card 17 is a storage medium storing a video game program, and is received by the slot in the lower housing 13b.

Figure 2:
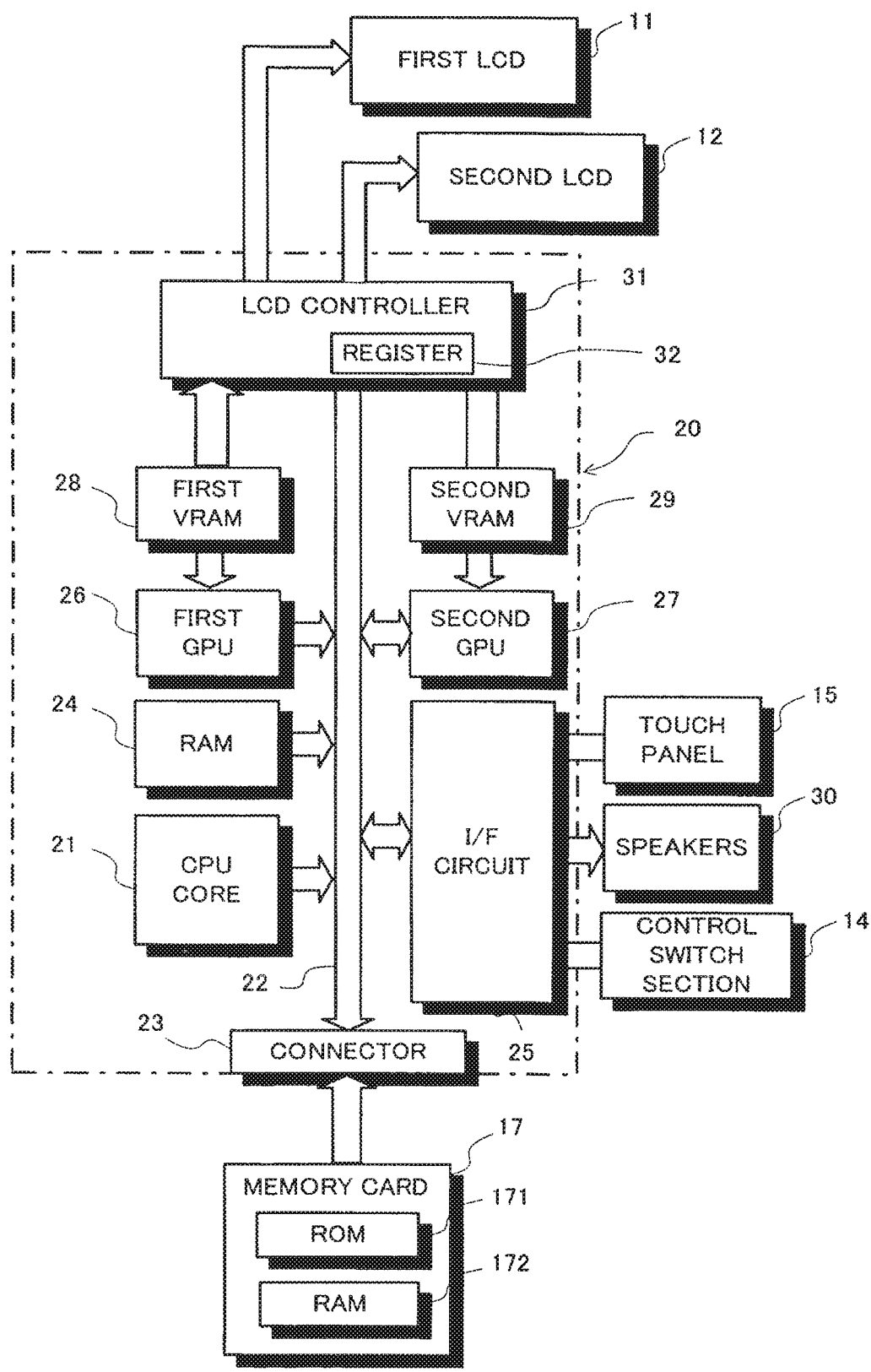
FIG. 2 shows an internal configuration of the video game device.

Referring now to FIG. 2, an internal configuration of the video game device 10 will be described. Referring to FIG. 2, a CPU core 21 is mounted on an electronic circuit board 20 accommodated in the housing 13. The CPU core 21 is connected to a connector 23, an input/output interface circuit (referred to simply as an "I/F circuit") 25, a first GPU (Graphics Processing Unit) 26, a second GPU 27, a RAM 24 and an LCD controller 31, via a bus 22. The connector 23 can receive the memory card 17. The memory card 17 includes therein a ROM 171 storing a video game program, and a RAM 172 rewritably storing backup data. The video game program stored in the ROM 171 of the memory card 17 is loaded to the RAM 24, and the loaded video game program is executed by the CPU core 21. In addition to the video game program, the RAM 24 also stores temporary data produced while the CPU core 21 is running the video game program, and other data for producing game images. The I/F circuit 25 is connected to the touch panel 15, the speakers 30, and a control switch section 14 of FIG. 1 including the cross-shaped switch 14a, the A button 14d, etc. The speakers 30 are placed behind the sound slits 18a and 18b.

A first VRAM (Video RAM) 28 is connected to the first GPU 26, and a second VRAM 29 is connected to the second GPU 27. In response to an instruction from the CPU core 21, the first GPU 26 produces a first game image and renders it on the first VRAM 28, based on data stored in the RAM 24 for producing game images. Similarly, the second GPU 27 produces a second game image and renders it on the second VRAM 29 in response to an instruction from the CPU core 21. The first VRAM 28 and the second VRAM 29 are connected to the LCD controller 31.

The LCD controller 31 includes a register 32. The register 32 stores a value of 0 or 1 in response to an instruction from the CPU core 21. When the value stored in the register 32 is 0, the LCD controller 31 outputs the first game image rendered on the first VRAM 28 to the first LCD 11 and outputs the second game image rendered on the second VRAM 29 to the second LCD 12. When the value stored in the register 32 is 1, the LCD controller 31 outputs the first game image rendered on the first VRAM 28 to the second LCD 12 and outputs the second game image rendered on the second VRAM 29 to the first LCD 11.

The configuration of the video game device 10 described above is merely an example, and the present invention is applicable to any computer system having at least one display device. The video game program of the present invention may be supplied to the computer system via a wired or wireless communications line, instead of via an external storage medium such as the memory card 17. Alternatively, the video game program may be pre-stored in a non-volatile storage device inside the computer system.

Figure 3:
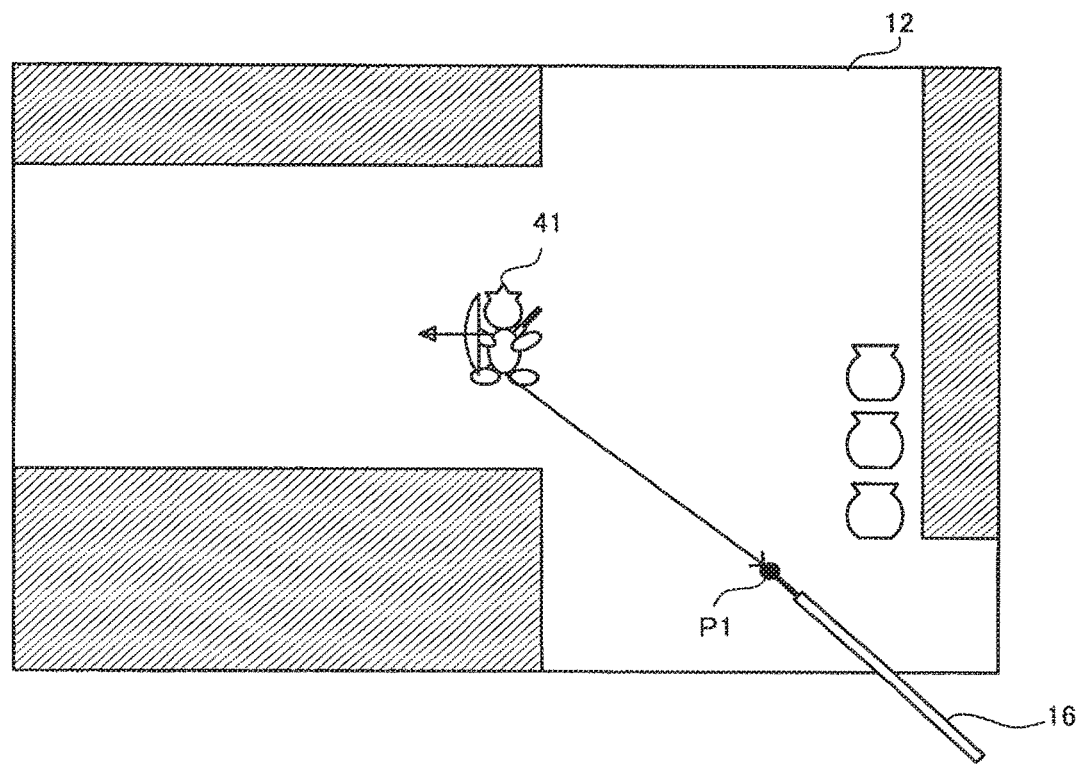
FIG. 3 shows an exemplary game screen according to the embodiment of the present invention.
Figure 4:
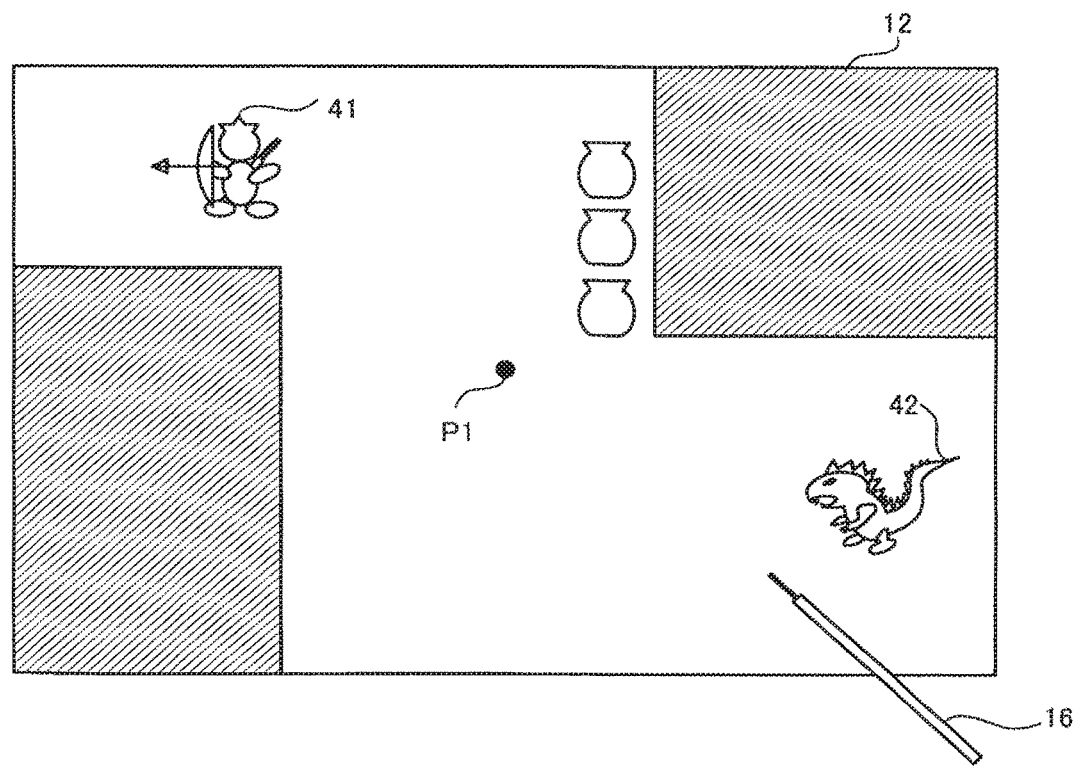
FIG. 4 shows a game screen after the display area has been moved from the position of FIG. 3.

An outline of the game to be played by executing the video game program by the video game device 10 will now be described. In this game, there are a player character controlled by the player and enemy characters in a three-dimensional virtual game space. The object of the game is for the player to control the player character to attack and take down the enemy characters. Referring now to FIGS. 3 and 4, the outline of the game will be described.

FIG. 3 shows an exemplary game screen according to the present embodiment. Referring to FIG. 3, the image of an area of the game space including the player character 41 is displayed on the second LCD 12. In the present embodiment, the first LCD 11 may not be used, or may be used to display various parameters indicating the physical strength and the capabilities of the player character, or other information such as items owned by the player character.

Referring to FIG. 3, the player character 41 is displayed at the center of the screen of the second LCD 12. In the present embodiment, the player character 41 is displayed at the center of the screen except when performing an operation of moving the display area (the details of which will be described later). The player character 41 can use items (weapons) such as a sword or a bow and arrow to attack an enemy character near the player character 41 with a sword or to shoot an arrow at an enemy character away from the player character 41. In this game, the player character 41 is allowed to use only one item at once, whereby the player needs to play the game while switching items to be used by the player character 41 from one to another. In the present embodiment, when the player character 41 is to use a bow and arrow, the player can move the display area by making an input on the touch panel.

FIG. 3 shows a game screen where the player character 41 is ready to use a bow and arrow. In this situation, the player can move the display area. Specifically, the player using the stylus 16 specifies an intended position on the screen (on the input surface of the touch panel 15) based on which the display area is to be moved. For example, when the player is to shoot an arrow in the lower right direction of the screen, the player specifies, with the stylus 16, a position away from the player character 41 toward the lower right corner (i.e., the position at which a point P1 in the game space is displayed) as shown in FIG. 3.

FIG. 4 shows a game screen after the display area has been moved from the position of FIG. 3. When the player makes an input on the touch panel 15, the video game device 10 detects the coordinates (input coordinates) of the position (input position) on the input surface of the touch panel 15 that is touched by the player. Then, the video game device 10 calculates a two-dimensional vector (a difference vector to be described later) extending from a predetermined reference position on the screen to the input position. In this example, the reference position is the center of the screen. The display area is moved based on this vector, the details of which will be described later. In FIG. 4, the display area has been moved so that the point P1, which is at the end of the vector in FIG. 3, is now displayed at the center of the screen.

From FIG. 3 to FIG. 4, the display area has been moved in the lower right direction. Thus, the area of the game space in the lower right direction from the player character 41 is chiefly displayed on the screen. In other words, more of the area in the lower right direction, into which the player is to shoot an arrow, is displayed on the screen. Such a game screen is preferable for the player as it displays more of the area in the direction in which the player character 41 is to shoot an arrow. For example, referring to FIG. 4, the player can now see an enemy character 42, which could not be found in the game screen of FIG. 3. Because the player is allowed to freely move the display area, the player can more effectively attack enemy characters with a bow and arrow, thus improving the playability of the game.

Figure 5:
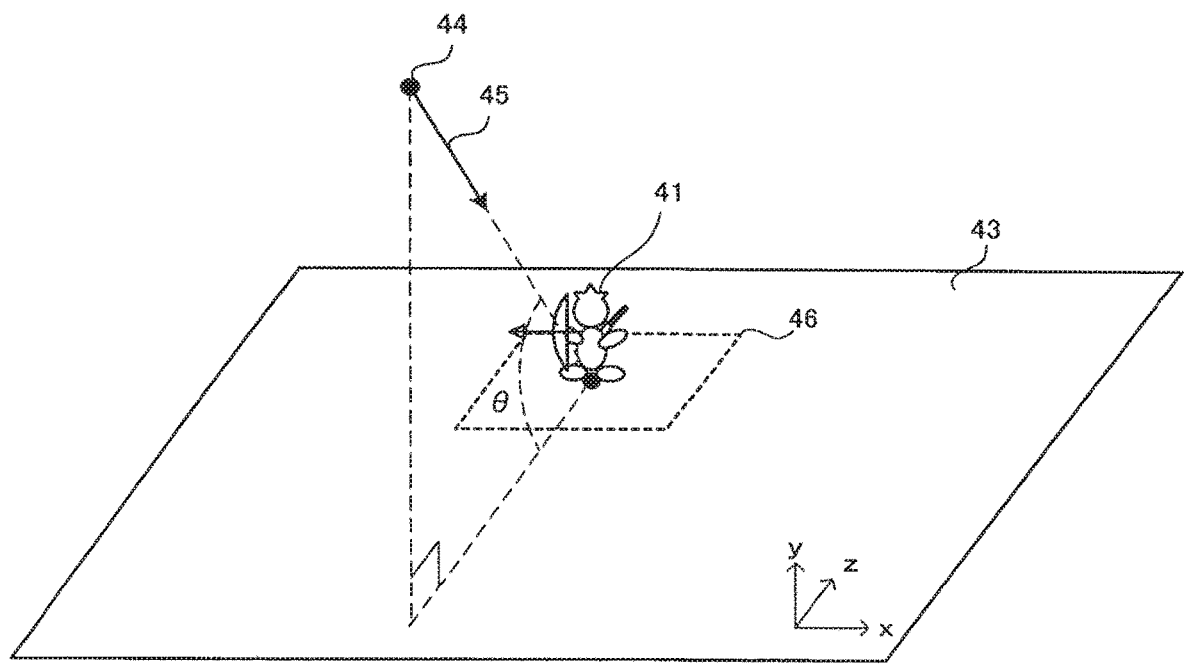
FIG. 5 schematically shows a virtual three-dimensional game space.

The details of the game process to be performed by the video game device 10 when executing the video game program will now be described. First, referring to FIG. 5, the virtual game space created in this game process will be described. FIG. 5 schematically shows a virtual three-dimensional game space. As shown in FIG. 5, a ground 43 is created in the virtual three-dimensional game space, on which the player character can be moved. The ground 43 is parallel to the xz plane of the world coordinate system for representing positions in the game space. The virtual camera for displaying an image of the game space on the second LCD 12 is positioned so that the viewing direction (an arrow 45 shown in FIG. 5) has a predetermined angle of depression with respect to the ground. The angle of depression θ is set to be less than 90°. Moreover, the viewing direction of the virtual camera is parallel to the z axis when projected onto the xz plane. Therefore, an area of the virtual space to be displayed on the screen (i.e., the area of which an image is taken by the virtual camera; hereinafter referred to as the "display area") 46 is in a trapezoidal shape in the case of a perspective projection, and in a rectangular shape in the case of a parallel projection. The image of the game space taken by the virtual camera is displayed on the screen so that the x-axis direction of the game space coincides with the horizontal direction of the screen (the X-axis direction of the screen coordinate system), and the z-axis direction of the game space coincides with the vertical direction of the screen (the Y-axis direction of the screen coordinate system) in the center of the screen. Note that the screen coordinate system is a coordinate system with the upper left corner of the screen being the origin, the downward direction of the screen being the positive Y-axis direction, and the rightward direction of the screen being the positive X-axis direction.

While the display area is not being moved, the point of sight of the virtual camera is set to be the position of the player character 41. Therefore, in this case, the player character 41 is displayed at the center of the screen. A position 44 of the virtual camera is determined based on the position of the point of sight. In the present embodiment, the position of the virtual camera in the y-axis direction is predetermined, and as the position of the point of sight moves, the virtual camera moves in parallel to the xz plane without changing the viewing direction. Specifically, the amount by which the point of sight is moved with respect to the x-axis direction is equal to the amount by which the position 44 of the virtual camera is moved with respect to the x-axis direction, and the amount by which the point of sight is moved with respect to the z-axis direction is equal to the amount by which the position 44 of the virtual camera is moved with respect to the z-axis direction.

Figure 6:
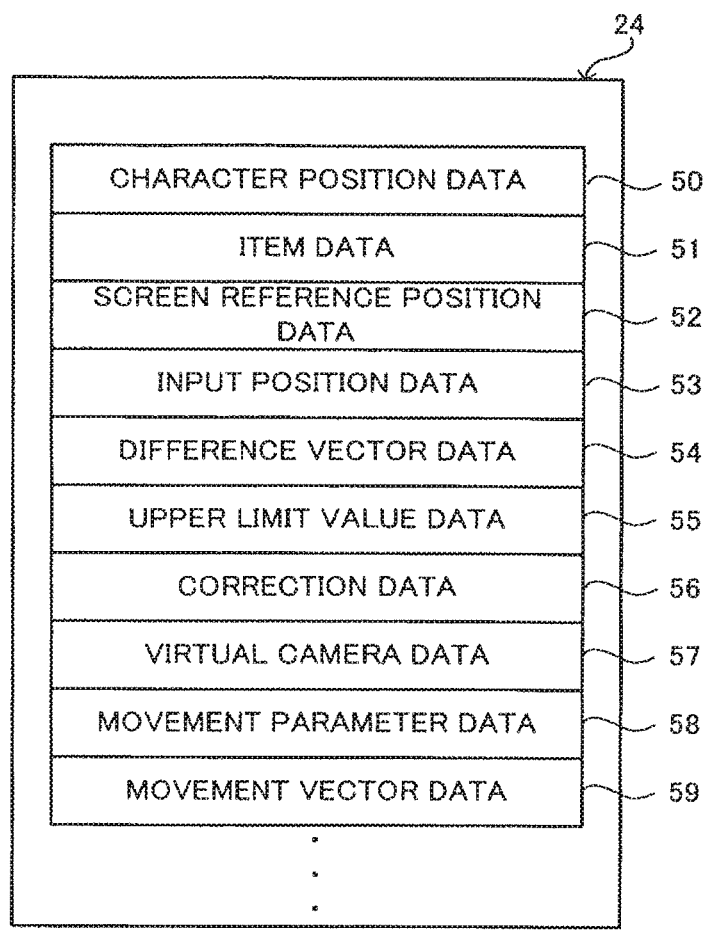
FIG. 6 shows important data stored in a RAM 24 of a video game device 10.

Important data used in the game process will now be described with reference to FIG. 6. FIG. 6 shows important data stored in the RAM 24 of the video game device 10. Referring to FIG. 6, the RAM 24 stores character position data 50, item data 51, reference position data 52, input position data 53, difference vector data 54, upper limit value data 55, correction data 56, virtual camera data 57, movement parameter data 58, movement vector data 59, etc. In addition to those shown in FIG. 6, the RAM 24 also stores other data necessary for the game process, such as player character data (e.g., the image data and the position data of the player character), and game space data (e.g., the terrain data).

The character position data 50 is data representing the position of the player character in the game space (character position). Specifically, the character position data 50 is a set of coordinates in the world coordinate system (three-dimensional coordinate system). The item data 51 is data representing an item that can currently be used by the player character. For example, when the player character is in a state where it is ready to use a bow and arrow, the item data 51 represents a bow and arrow.

The reference position data 52 is data representing a predetermined reference position on the screen (screen reference position). Specifically, the reference position data 52 is a set of coordinates in the screen coordinate system (two-dimensional coordinate system). The reference position is predetermined by the video game program. In the present embodiment, the reference position is the center of the screen. The reference position data 52 is used for calculating the difference vector.

The input position data 53 is data representing the position on the screen at which the player's input is detected by the touch panel 15 (input position). Specifically, the input position data 53 is a set of coordinates in the screen coordinate system (two-dimensional coordinate system). The difference vector data 54 is data representing a two-dimensional vector (difference vector) extending from the screen reference position to the input position.

The upper limit value data 55 is data representing the greatest possible magnitude of the difference vector (upper limit value). In the present embodiment, if the magnitude of the difference vector calculated based on the screen reference position and the input position exceeds the upper limit value, the magnitude of the difference vector is corrected to the upper limit value. The upper limit value is predetermined by the video game program. The correction data 56 is data representing multipliers used for correcting the components (the X component and the Y component) of the difference vector. The correction data 56 includes data representing a multiplier used for correcting the X component (the first multiplier), and data representing another multiplier used for correcting the Y component (the second multiplier).

The virtual camera data 57 is data representing various parameters of the virtual camera. The parameters of the virtual camera include the position of the virtual camera, the position of the point of sight, and the viewing direction.

The movement parameter data 58 is data representing the direction in which the display area is to be moved and the amount by which it is to be moved. Specifically, the movement parameter data 58 represents the coordinates (target coordinates) of the position of the target point (target position) in the game space. The target point is a point to which the point of sight of the virtual camera should be moved. Specifically, the movement parameter data 58 is a set of coordinates represented by the world coordinate system. The movement parameter data is calculated based on the difference vector, the details of which will be described later. In other embodiments, the movement parameter data 58 may be vector data representing the direction in which the point of sight is moved and the amount by which it is moved, or vector data representing the direction in which the position of the virtual camera is moved and the amount by which it is moved.

The movement vector data 59 is data representing a vector (movement vector), which represents the direction in which the point of sight is moved and the amount by which it is moved per unit time (e.g., per frame). The movement vector is calculated based on a vector from the current position of the point of sight to the target position. While the movement vector is a three-dimensional vector, it may be a two-dimensional vector made up of the x component and the z component in a case where the point of sight is moved only across the ground parallel to the xz plane.

Figure 7:
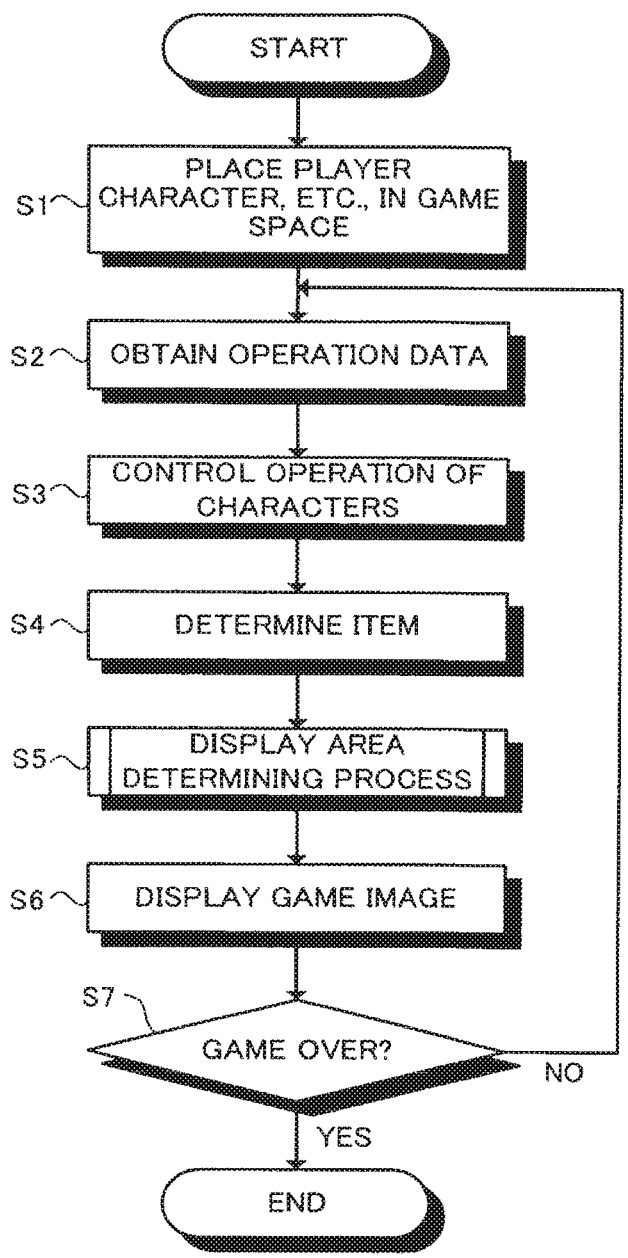
FIG. 7 is a flow chart showing a game process performed by the video game device 10.

Referring now to FIGS. 7 to 13, the details of the game process to be performed by the video game device 10 when executing the video game program will be described. FIG. 7 is a flow chart showing the flow of the game process performed by the video game device 10. When the power of the video game device 10 is turned ON, the CPU core 21 of the video game device 10 executes a boot program stored in a boot ROM (not shown), thus initializing various units such as the RAM 24. The video game program stored in the memory card 17 is loaded to the RAM 24, and the CPU core 21 starts executing the video game program. The flow chart of FIG. 7 shows the game process performed after the completion of the process described above. In the flow charts of FIGS. 7 and 8, parts of the game process related to the operation of moving the display area are described in detail, and other parts of the game process that are not directly related to the present invention will not be described in detail.

In step S1 of FIG. 7, the game space is first created, wherein the player character and the enemy characters are placed at their initial positions. The virtual camera is positioned to take the image of the player character and the surrounding portion of the game space, and the game space as viewed from the virtual camera in the viewing direction is displayed on the second LCD. In step S2 (following step S1) and the subsequent steps, a game operation input from the player using a touch panel, or the like, is received, based on which the game proceeds. The loop through steps S2 to S7 is repeated at a rate of one iteration per frame.

In step S2, the CPU core 21 obtains, from the control switch section 14, operation data indicating whether or not any of the control switches 14a, 14f, 14R and 14L is being pressed. In step S3, the operation of the player character and the enemy characters is controlled. Specifically, the operation of the player character (including the movement operation and the attack operation) is determined based on the operation data obtained in step S2. In a movement operation of the player character, the character position data 50 stored in the RAM 24 is updated to indicate the position after the movement. The operation of the enemy character is determined according to a predetermined algorithm in the video game program.

In step S4, an item used by the player character is determined. The player character uses a bow and arrow while the L button 14L is being pressed, and a sword while the L button 14L is not being pressed. Specifically, based on the operation data obtained in step S2, the CPU core 21 determines whether or not the L button 14L is being pressed, according to which an item used by the player character is determined. Then, the item data 51 stored in the RAM 24 is updated to indicate the item determined in step S4. Step S4 is followed by step S5.

In step S5, the display area determining process is performed. The display area determining process is a process of determining the display area based on the player's operation. Referring now to FIGS. 8 to 13, the details of the display area determining process will be described.

Figure 8:
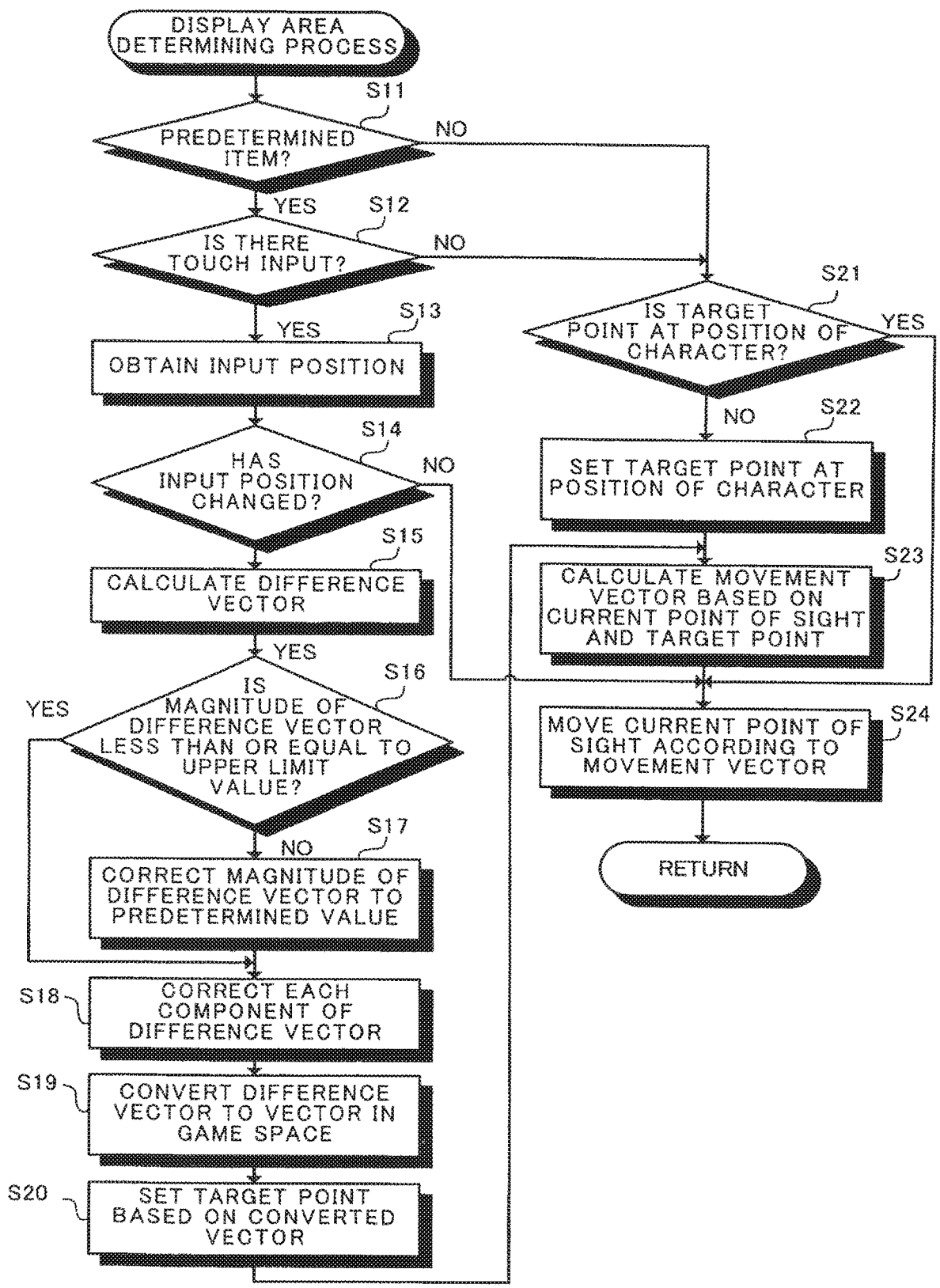
FIG. 8 is a flow chart showing the detailed flow of step S5 shown in FIG. 7.

FIG. 8 is a flow chart showing the detailed flow of step S5 shown in FIG. 7. In the display area determining process, it is first determined in step S11 whether or not the item used by the player character is a predetermined item (a bow and arrow in the illustrated example). Specifically, the CPU core 21 determines whether or not the item data 51 stored in the RAM 24 indicates the predetermined item. If the item data 51 indicates the predetermined item, the process proceeds to step S12. If the item data 51 indicates an item other than the predetermined item, the process proceeds to step S21.

In step S12, it is determined whether or not there is an input (touch input) on the touch panel 15 from the player. Specifically, the CPU core 21 reads data outputted from the touch panel 15 to determine whether or not position data is being outputted from the touch panel 15. If position data is being outputted from the touch panel 15, it is determined that there is a touch input and the process proceeds to step S13. If data indicating that there is no input is being outputted from the touch panel 15, it is determined that there is no touch input and the process proceeds to step S21.

In step S13, the input position is obtained. Specifically, the CPU core 21 updates the input position data 53 stored in the RAM 24 to the position data taken from the touch panel 15 in step S12. The position data before the update is separately stored in the RAM 24. Step S13 is followed by step S14.

In step S14, it is determined whether or not the input position obtained in step S13 is different from the previous input position. Specifically, it is determined whether or not the input position indicated by the input position data 53 updated in step S13 is different from that before the update. If it is determined in step S14 that the input position has been changed, the process proceeds to step S15. If it is determined that the input position has not been changed, the process proceeds to step S24 to be described later. In other embodiments, if the distance between the input position before the update and the updated input position is less than or equal to a predetermined distance, it may be determined that the input position has not been changed, whereby the process proceeds to step S24.

Figure 9:
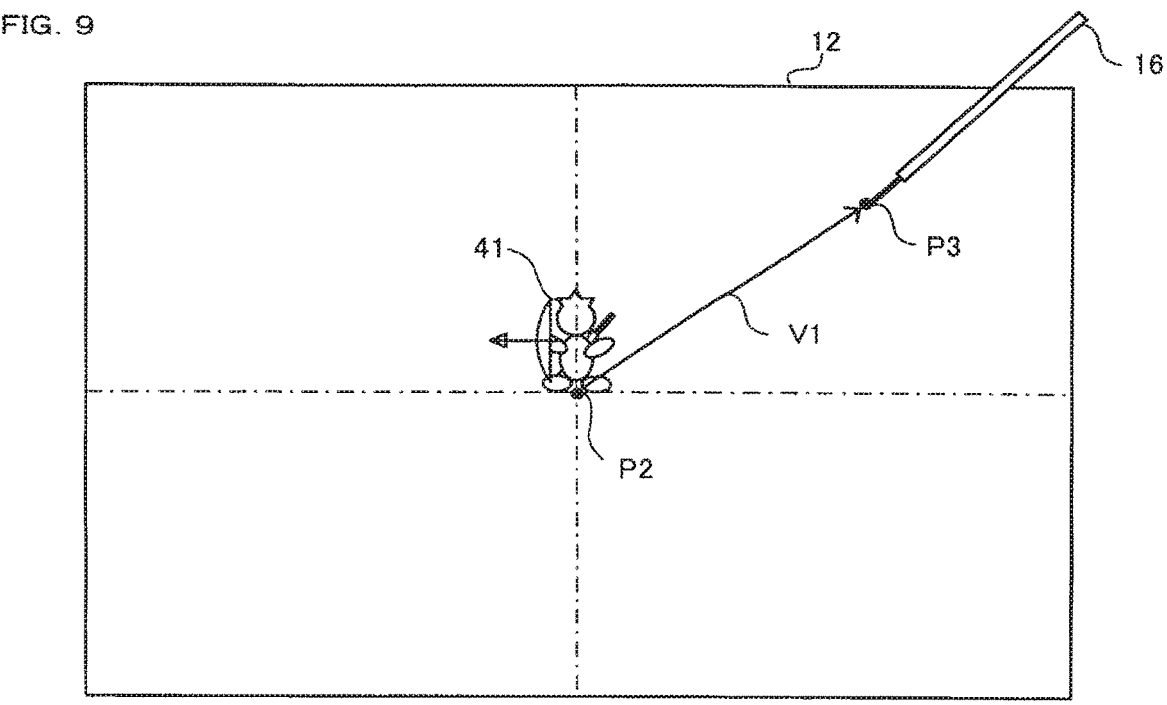
FIG. 9 illustrates the process of step S15 shown in FIG. 8.

In step S15, the difference vector is calculated. FIG. 9 illustrates the process of step S15 shown in FIG. 8. It is assumed herein that the player character 41 is displayed at the center of the screen as shown in FIG. 9. The difference vector is calculated as being a vector V1 extending from the screen reference position (the position of the point P2) to the input position (the position of the point P3). The input position is represented by the input position data 53 stored in the RAM 24 in step S13. Thus, the CPU core 21 calculates the difference vector using the reference position data 52 and the input position data 53 stored in the RAM 24. The calculated difference vector is stored in the RAM 24 as the updated difference vector data 54. Step S15 is followed by step S16.

Figure 10:
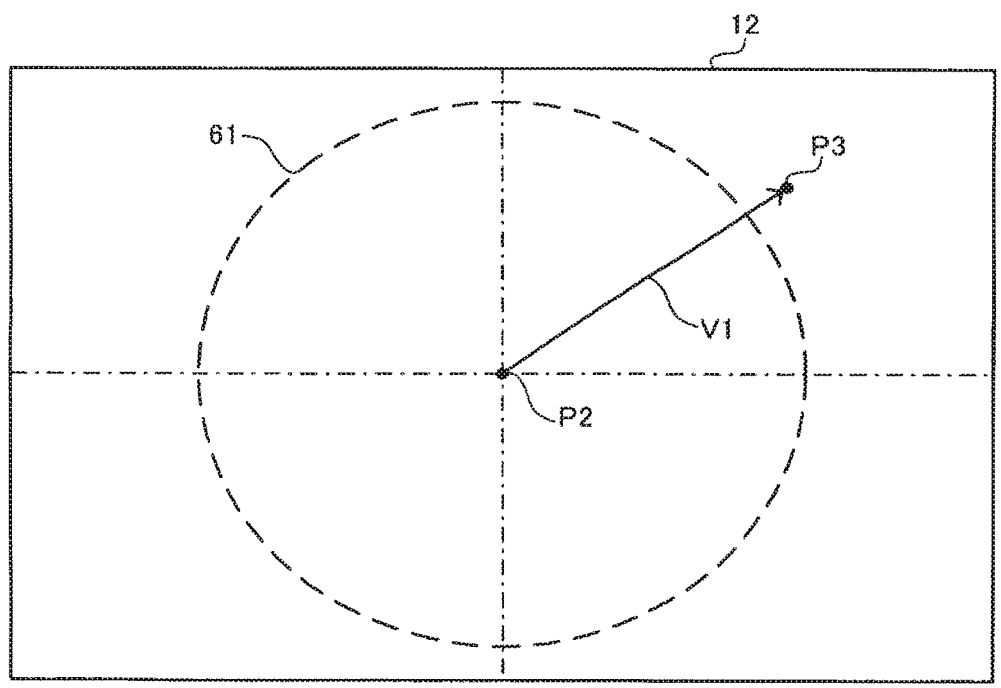
FIG. 10 illustrates the process of step S16 shown in FIG. 8.

In step S16, it is determined whether or not the magnitude of the difference vector calculated in step S15 is less than or equal to a predetermined upper limit value. The upper limit value is represented by the upper limit value data 55 stored in the RAM 24. The CPU core 21 performs the determination of step S16 referring to the difference vector data 54 and the upper limit value data 55 stored in the RAM 24. FIG. 10 illustrates the process of step S16 shown in FIG. 8. The magnitude of the difference vector being less than or equal to the upper limit value means that the position P3 of the end point of the vector V1 shown in FIG. 10 is within an area 61 shown in FIG. 10. The area 61 is a circular area centered about the position P2 and having a radius equal to the upper limit value. Thus, the determination of step S16 is performed by determining whether or not the input position P3 specified by the player is within the circular area 61 centered about the position P2 on the screen. If it is determined in step S16 that the magnitude of the difference vector is greater than the predetermined upper limit value, the process proceeds to step S17. If it is determined that the magnitude of the difference vector is less than or equal to the predetermined upper limit value, the process proceeds to step S18.

Figure 11:
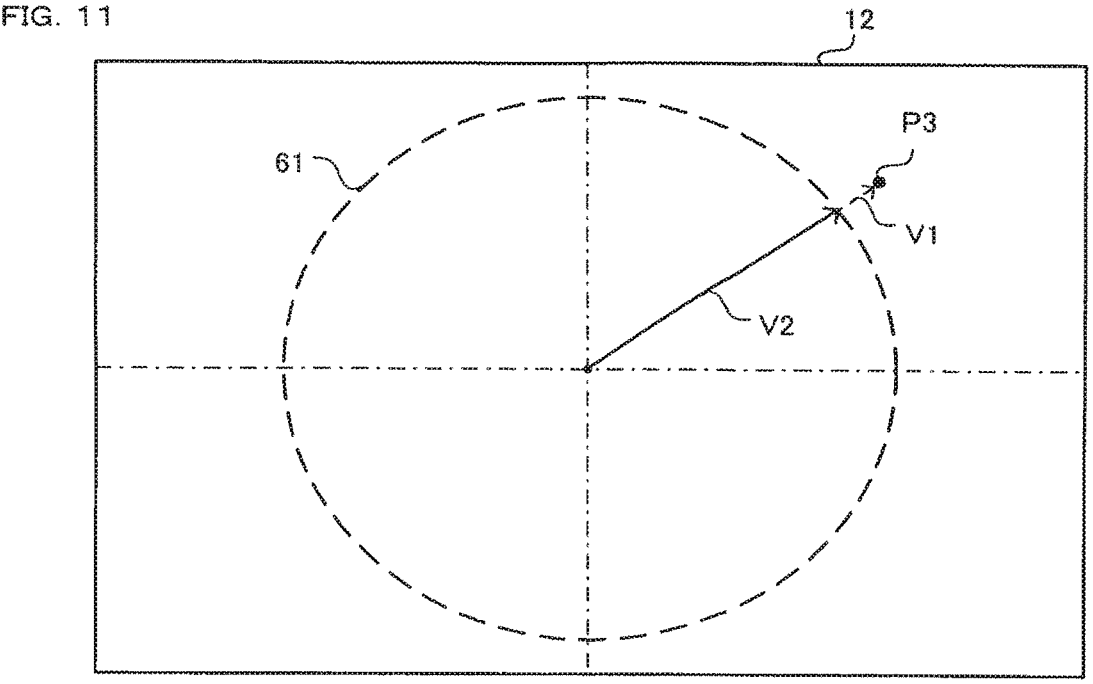
FIG. 11 illustrates the process of step S17 shown in FIG. 8.

In step S17, the magnitude of the difference vector calculated in step S15 is corrected to the upper limit value. FIG. 11 illustrates the process of step S17 shown in FIG. 8. As shown in FIG. 11, if the position P3 of the end point of the vector V1 is outside the area 61, the difference vector is corrected to a vector V2. The vector V2 is a vector with the same direction as the vector V1 but with the end point being on the periphery of the area 61. In this process, the difference vector data 54 stored in the RAM 24 is updated to the difference vector as corrected in step S17. Step S17 is followed by step S18.

The process of steps S16 and S17 is a process of limiting the magnitude of the difference vector. If the magnitude of the difference vector is not limited, moving the display area based on the magnitude and direction of the difference vector may result in the player character 41 being partly outside the screen. In view of this, in the present embodiment, the magnitude of the difference vector is limited by the process of steps S16 and S17 so as to prevent the player character 41 from being partly outside the screen. In order to always keep the player character entirely within the screen, the upper limit value may be set to be slightly smaller than the shortest distance from the center of the screen to an edge of the screen (the distance from the center of the screen to the upper or lower edge of the screen in the example shown in FIG. 11). Specifically, the upper limit value may be set to be the distance minus the width of the player character as displayed on the screen.

In step S18, the values of the components (the X component and the Y component) of the difference vector are corrected. Specifically, the CPU core 21 multiplies the X component of the difference vector by the first multiplier and the Y component of the difference vector by the second multiplier. The first and second multipliers can be known by referring to the correction data 56 stored in the RAM 24. The CPU core 21 updates the difference vector data 54 stored in the RAM 24 to the difference vector as corrected in step S18.

Figure 12:
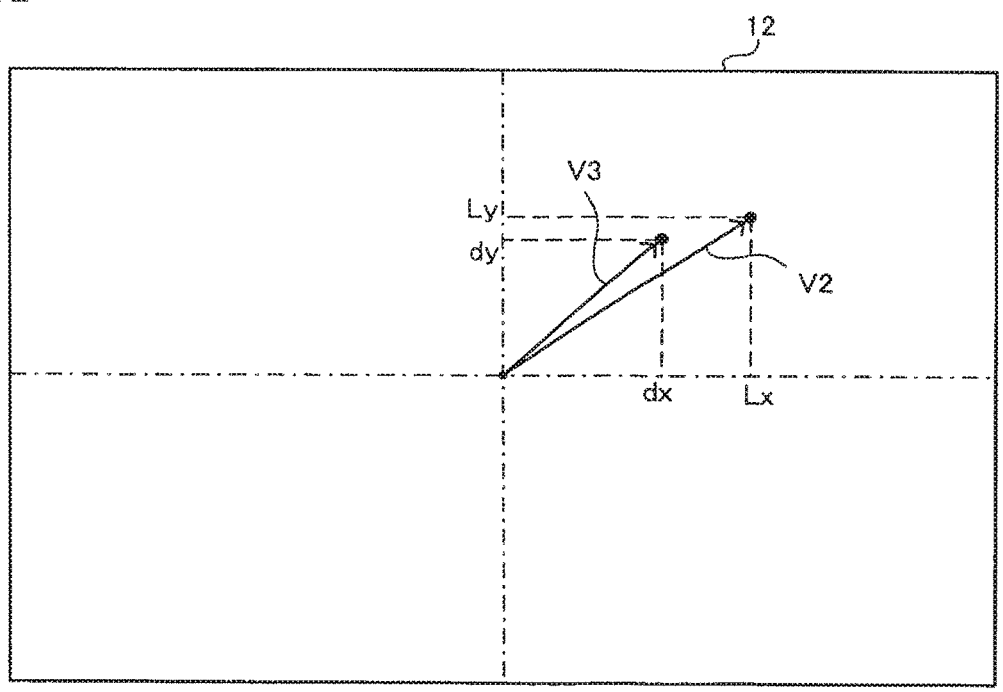
FIG. 12 illustrates the process of step S18 shown in FIG. 8.

FIG. 12 illustrates the process of step S18 shown in FIG. 8. In step S18, the uncorrected difference vector V2 is corrected to a vector V3. Where the components of the uncorrected difference vector V2 are (LX,LY) and those of the corrected difference vector V3 are (dX,dY), (dX,dY) are calculated by Expression 1 below:

$$dX = A1 \times LX$$

$$dY = A2 \times LY \qquad \text{Exp. 1}$$

where A1 is the first multiplier and A2 is the second multiplier. In the present embodiment, 0<A1<1 and 0<A2<1. Moreover, A1<A2. Thus, the vector is corrected so that the proportion of the Y component with respect to the X component of the vector V3 is greater than that of the vector V2. In step S18, the correction operation may be performed only for the X component of the vector V2. In other words, A2=1.

In step S18, the vector is corrected so that the proportion of the Y component with respect to the X component is increased from that of the uncorrected difference vector, in order to reduce the awkwardness that the player may feel when the display area is moved. The direction in which to move the display area in the game space is determined based on the direction of the difference vector (step S21 to be described later), the details of which will be described later. Without the process of step S18, the player may feel awkward, as the amount by which the display area is moved in the vertical direction of the screen (the Y-axis direction) may seem to be too small. The process of step S18 is for reducing such awkwardness.

In steps S19 and S20, following step S18, the position of the target point, to which the point of sight should be moved, is determined based on the difference vector. Specifically, the position of the target point is determined according to the direction in the game space based on the direction of the difference vector and the distance in the game space based on the magnitude of the difference vector.

Figure 13:
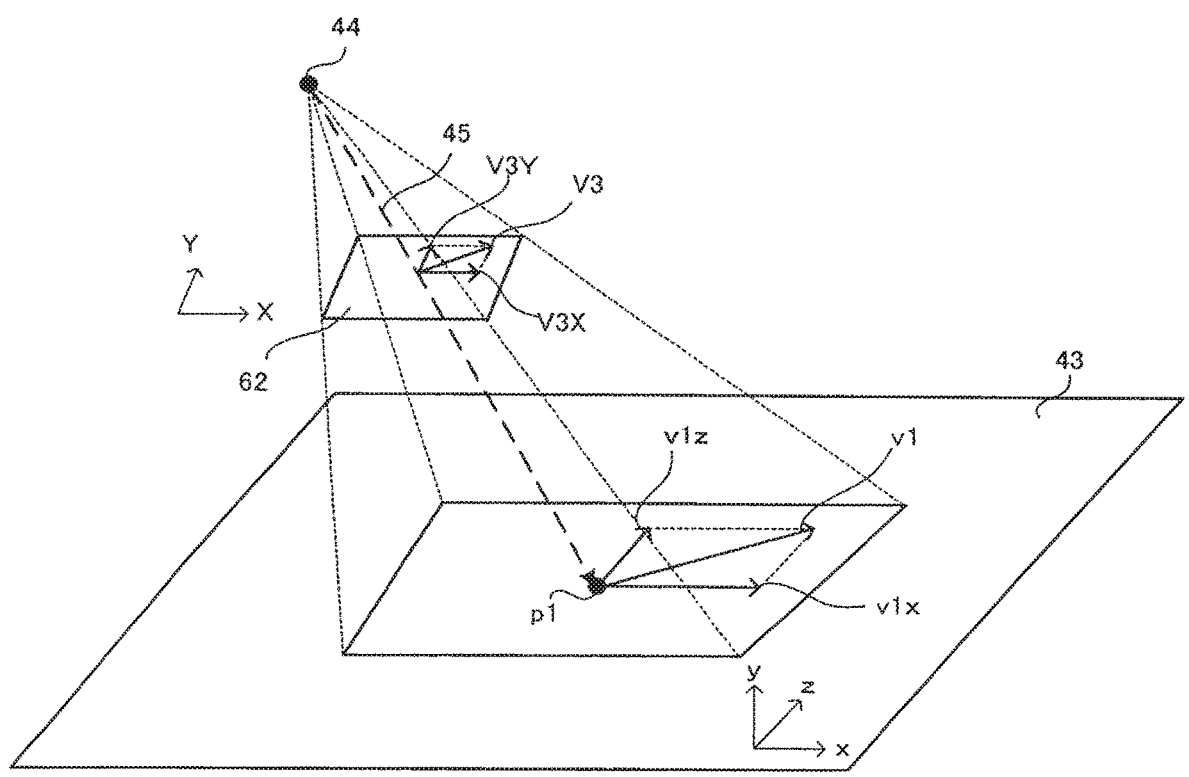
FIG. 13 illustrates the process of step S19 shown in FIG. 8.

In step S19, the CPU core 21 first converts the difference vector being a two-dimensional vector on the screen to a three-dimensional vector in the game space. FIG. 13 illustrates the process of step S19 shown in FIG. 8. In FIG. 13, a plane 62 is a two-dimensional plane onto which the game space as viewed from the virtual camera is projected, and corresponds to the screen on which the game space is displayed. The vector V3 is the difference vector, a vector V3X represents the X component of the difference vector V3, and a vector V3Y represents the Y component of the difference vector V3. A vector v1 is a three-dimensional vector obtained by converting the difference vector V3, a vector v1x represents the x component of the vector v1, and a vector v1y represents the y component of the difference vector v1. The three-dimensional vector will be hereinafter referred to as the "space vector".

The magnitude of the space vector v1 is determined based on the magnitude of the difference vector V3, and the direction of the space vector v1 is determined based on the direction of the difference vector V3. Specifically, the space vector v1 is calculated by Expression 2 below:

$$v1x = B \times V3X$$

$$v1y = 0$$

$$v1z = B \times V3Y \qquad \text{Exp. 2}$$

As shown in Expression 2, the value of the x component of the space vector is obtained by multiplying the value of the X component of the difference vector by a predetermined adjustment value B. Similarly, the value of the z component of the space vector is obtained by multiplying the value of the Y component of the difference vector by the adjustment value B. The value of the y component of the space vector is set to be equal to the height of the ground (i.e., zero). Thus, the difference vector V3 is converted to the space vector v1 parallel to the xz plane of the game space. The component in the horizontal direction on the screen corresponds to the component in the x-axis direction in the game space (the direction displayed in the horizontal direction on the screen). The component in the vertical direction on the screen corresponds to the component in the z-axis direction in the game space (the direction displayed in the vertical direction at the center of the screen). Thus, in the present embodiment, the space vector can be easily calculated from the difference vector with a small amount of calculation.

Although the start point of the vector v1 coincides with the point of sight in FIG. 13, the start point of the vector v1 is a position determined based on the position of the player character (step S20 to be described later), and may not always coincide with the point of sight. This is because after the display area is moved by a player's touch input, the point of sight and the position of the player character may not always coincide with each other.

Then, in step S20, the position of the target point is determined based on the space vector converted in step S19. Specifically, the position of the target point is determined based on the direction and the magnitude of the space vector with respect to a fixed point in the game space. The fixed point is a point in the game space determined based on the position of the player character. The fixed point is fixed in a sense that "it is fixedly set under the condition that the position of the player character is fixed", and it does not have to be always fixed at a particular position in the game space. The position of the fixed point changes as the position of the player character changes. In the illustrated example, the fixed point is set at the position of the player character. Thus, the new target point is at a position away from the player character by the magnitude of the space vector (distance) in the direction of the space vector. The CPU core 21 calculates the position of the target point referring to the character position data 50 stored in the RAM 24 and the space vector calculated in step S19. The data of the position of the target point calculated in step S20 is stored in the RAM 24 as the updated movement parameter data 58. Step S20 is followed by step S23.

If the determination result from step S11 or that from step S12 is negative, the process proceeds to step S21. In step S21, it is determined whether or not the current target point is at the position of the player character in the game space. Specifically, the CPU core 21 refers to the character position data 50 and the movement parameter data 58 stored in the RAM 24, and determines whether or not the position (coordinates) of the character position data 50 is the same as that of the movement parameter data 58. If the positions are the same, it is determined that the target point is at the position of the player character. If the positions are not the same, it is determined that the target point is not at the position of the player character. If it is determined that the target point is at the position of the player character, the process proceeds to step S24, skipping steps S22 and S23. If it is determined that the target position is at the position of the player character, the process proceeds to step S22.

In step S22, the target point is set at the position of the character. Specifically, the CPU core 21 updates the movement parameter data 58 stored in the RAM 24 to the position (coordinates) represented by the character position data 50. Where the player character is using an item other than a bow and arrow or where there is no touch input, the target point is set at the position of the player character through steps S21 and S22, whereby the player character is displayed at the center of the screen. Step S22 is followed by step S23.

Figure 14:
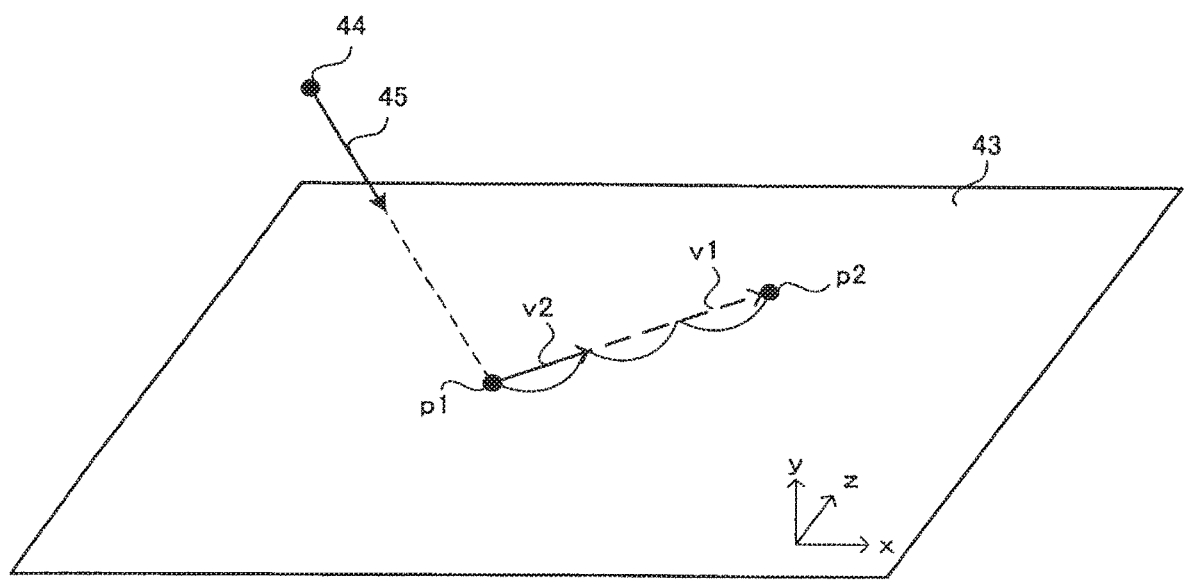
FIG. 14 illustrates the process of step S23 shown in FIG. 8.

In step S23, the movement vector is calculated based on the current position of the point of sight and the position of the target point. As described above, the movement vector is a vector representing the direction in which the point of sight (display area) is moved and the amount by which it is moved per unit time (e.g., per frame). FIG. 14 illustrates the process of step S23 shown in FIG. 8. In FIG. 14, the point p1 represents the current position of the point of sight, and the point p2 represents the position of the target point. The vector v1 is the space vector calculated in step S19. In step S23, the CPU core 21 calculates a vector v2 by dividing each component of the vector v1 by a predetermined number (the predetermined number is 3 in FIG. 14). The vector v2 is the movement vector. The CPU core 21 stores the data of the calculated movement vector in the RAM 24 as the movement vector data 59.

As shown in step S23, in the present embodiment, a vector V5 obtained by dividing the vector v1 by a predetermined number is used as the movement vector, whereby the display area is moved to the target position over a plurality of frames (the same number of frames as the predetermined number). Thus, it is possible to prevent the abrupt movement of the display area on the game screen, which may be difficult for the player to follow. In other embodiments, the vector v1 may be used as the movement vector if the magnitude of the vector v1 is less than or equal to a predetermined value. In other embodiments, the predetermined number may be 1. Step S23 is followed by step S24.

In step S24, the point of sight is moved according to the movement vector calculated in step S23. Specifically, the CPU core 21 updates the data representing the point of sight included in the virtual camera data 57 stored in the RAM 24 to data representing the new position (coordinates) of the point of sight after it is moved. Moreover, the data representing the position of the virtual camera is updated according to the new position of the point of sight after it is moved. After step S24, the CPU core 21 exits the display area determining process.

Referring back to FIG. 7, the game image is displayed in step S6. Specifically, the CPU core 21 produces an image of the game space as viewed in the viewing direction from the position of the virtual camera, and displays the produced image on the second LCD 12. Since the parameters of the virtual camera (the position of the point of sight and the position of the virtual camera) have been updated in step S24, the display area has been moved in the displayed image. Step S6 is followed by step S7.

In step S7, it is determined whether or not the game is over. The determination of step S7 is made based on, for example, whether the player character has no remaining physical strength or whether the player character has taken down all the enemy characters. If it is determined in step S7 that the game is over, the CPU core 21 exits the game process shown in FIG. 7. If it is determined that the game is not over, the process proceeds to step S2, and then steps S2 to S7 are repeated until it is determined in step S7 that the game is over. The game process is as described above in detail.

In the present embodiment, an upper limit value is set for the difference vector and a correction operation is performed in step S17 so that the magnitude of the difference vector is within the upper limit value. In other embodiments, the upper limit value may be set for the space vector (the vector v1 shown in FIG. 13) obtained by converting the difference vector. In the present embodiment, a correction operation for adjusting the proportion between the magnitudes of the components of the difference vector is performed in step S18. In other embodiments, a correction operation for adjusting the proportion between the magnitudes of the components of the space vector may be performed. Specifically, the x component and the z component of the space vector may be corrected so as to increase the proportion of the z component with respect to the x component. Thus, the space vector can be calculated so that the proportion of the z-direction component of the space vector with respect to the x-direction component thereof is greater than the proportion of the Y-direction component of the difference vector with respect to the X-direction component thereof.

In the game process described above, the components of the difference vector are corrected in step S18 so as to increase the proportion of the Y component of the difference vector with respect to the X component thereof. In the present embodiment, when the difference vector is converted to the space vector in the game space in step S19, the adjustment value used for converting the X component of the difference vector to the x component of the space vector is the same as the adjustment value used for converting the Y component of the difference vector to the z component of the space vector. Therefore, without step S18, the ratio between the vertical direction (the Y component) and the horizontal direction (the X component) of the difference vector will be, as it is, the ratio between the vertical direction (the z component) and the horizontal direction (the x component) of the space vector. However, in the present embodiment, the viewing direction of the virtual camera is not perpendicular to the ground but is inclined in the Y-axis direction of the screen (the viewing direction in the virtual space is parallel to the Y-axis direction on the screen), whereby the displayed game space is compressed with respect to the Y-axis direction of the screen. Therefore, when the display area is moved by the same distance (distance in the game space) in the x-axis direction and in the z-axis direction, the amount by which the display area is moved in the z-axis direction on the screen will be smaller. Thus, if the ratio between the vertical direction and the horizontal direction of the difference vector is used, as it is, as the ratio between the vertical direction and the horizontal direction of the space vector, the amount by which the display area is moved in the vertical direction on the screen will be smaller. Then, the direction inputted by the player (i.e., the direction of the difference vector) does not match with the direction in which the display area is actually moved, whereby the player may feel awkward.

In view of this, in the present embodiment, the component of the Y-axis direction of the difference vector (the direction on the screen corresponding to the viewing direction of the virtual camera) is increased with respect to the component of the X-axis direction. Thus, the display area is moved at the same ratio as the ratio between the vertical direction and the horizontal direction of the difference vector, whereby it is possible to reduce or eliminate such awkwardness that may be felt by the player.

Figure 15:
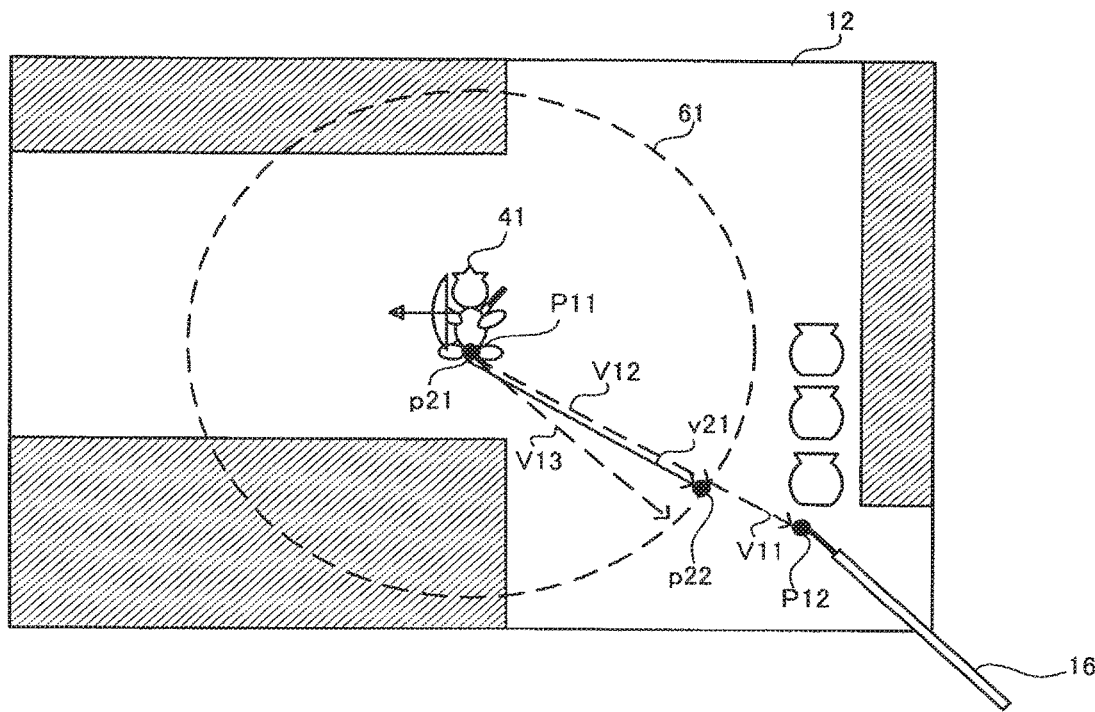
FIG. 15 shows the game screen immediately after the player performs a touch input operation.
Figure 16:
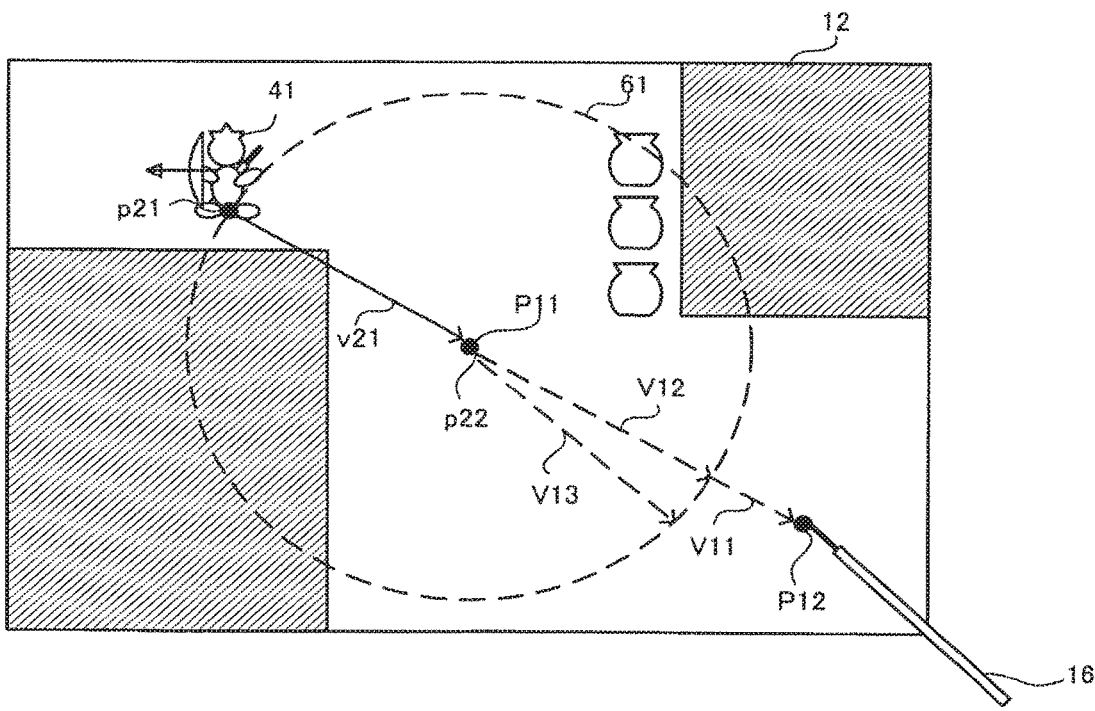
FIG. 16 shows the game screen a predetermined number of frames after FIG. 15 while the input position has remained unchanged.

FIGS. 15 and 16 show how the display area is moved when the player touches a lower right position on the screen. Note that in FIGS. 15 and 16, a point representing a position on the screen is denoted by a reference character with a capital letter "P", and a point representing a position in the game space is denoted by a reference character with a small letter "p". Similarly, in FIGS. 15 and 16, a two-dimensional vector on the screen is denoted by a reference character with a capital letter "V", and a vector in the game space is denoted by a reference character with a small letter "v".

FIG. 15 shows the game screen immediately after the player performs a touch input operation. In FIG. 15, since it is immediately after the touch input, the player character 41 is displayed at the center of the screen. Specifically, the position p21 of the player character 41 corresponds to (is displayed at) the reference position P11 on the screen. When the player touches the position P12 on the screen, a vector V11 extending from the reference position P11 to the input position P12 is calculated as the difference vector (step S15). Then, according to the area 61 represented by the upper limit value, the difference vector is corrected to a vector V12 (step S17). The vector V12 is further corrected to a vector V13 so as to increase the proportion of the Y component with respect to the X component (step S18). Then, the two-dimensional vector V13 on the screen is converted to a space vector v21 in the game space (step S19). A target position p22 in the game space is determined based on the space vector v21 with respect to the position p21 of the player character in the game space (step S20). Thus, the display area is moved so that the target position p22 is displayed at the center of the screen.

FIG. 16 shows the game screen a predetermined number of frames after FIG. 15 while the input position has remained unchanged. In FIG. 16, the point of sight is positioned at the target position p22, and the player character 41 is displayed near the upper left corner of the screen. Since the input position on the screen has remained unchanged from FIG. 15, the difference vector V13 is calculated in a similar manner to that in the case of FIG. 15. Moreover, the space vector v21 is calculated from the difference vector V13 in a similar manner to that in the case of FIG. 15. Therefore, the target position p22 is similar to that in the case of FIG. 15 (in the game space). In FIG. 16, since the point of sight has already been moved to the target position p22, the display area is not moved.

Thus, in the present embodiment, the difference vector used for moving the display area in the game space is determined based on the reference position on the screen and the input position on the screen. Since the difference vector is determined based on two positions on the screen, the magnitude of the difference vector is necessarily limited. Moreover, the difference vector is converted to a vector in the game space, and the display area is moved based on the obtained vector with respect to a fixed point in the game space. Therefore, the display area will be moved in an area within a predetermined distance from the fixed point, thereby limiting the area across which the display area is moved. By setting the fixed point at the position of the player character, the area across which the display area is moved is limited to an area centered about the position of the player character, whereby the player character can always be displayed within the screen.

As described above, according to the present embodiment, the display area can be moved according to the input position specified by the player, whereby the game screen can be displayed with a display area that is preferable for the player at any time. By limiting the magnitude of the difference vector to the upper limit value, it is possible to prevent the display area from being moved continuously in a certain direction. By adjusting the proportion between the X component and the Y component of the difference vector, it is possible to reduce the awkwardness that the player may feel when the display area is moved.

In the present embodiment, the player character is prevented from moving out of the screen by limiting the magnitude of the difference vector to the upper limit value. In other embodiments, whether or not the player character is within the display area may be determined before moving the display area so that the display area is moved only when the player character is within the display area. Specifically, after step S23, an operation may be performed for determining whether or not the player character is within the display area after being moved. The process may proceed to step S24 if the player character is within the display area, or may skip step S24 if the player character is not within the display area. In this case, steps S16 and S17 are not needed. In other embodiments, in the operation of setting the target position based on the difference vector (step S20), the target position may be set so that it is positioned within a predetermined range from the position of the player character. Also in this case, steps S16 and S17 are not needed.

In the present embodiment, the position of the virtual camera is moved as a specific method for moving the display area. The method for moving the display area is not limited to any particular method. For example, the position and the viewing direction of the virtual camera may be changed, or only the viewing direction of the virtual camera may be changed. In the present embodiment, the position of the virtual camera is moved only in the x-axis direction and in the z-axis direction. In other embodiments, the position of the virtual camera may be moved also in the y-axis direction.

While a three-dimensional virtual space is displayed on the screen in the present embodiment, the virtual space may be two-dimensional. Also in the case of a two-dimensional virtual space, the target point is set in the virtual space based on the difference vector, and the display area is moved so that the target point is displayed at a reference position on the screen (e.g., the center of the screen), as in the present embodiment.

While the present embodiment is directed to a case where the image processing program is used as a video game program, the present invention is not limited to video game applications, but is applicable to any application in which a virtual space is displayed on a screen, wherein the display area is moved.

While a touch panel is employed as the input device in the present embodiment, the input device may be any other suitable pointing device with which it is possible to detect a position on the display screen being specified by the user. For example, the input device may be a mouse, or the like, or an optical pointing device to be held by the user, which includes an image sensing device for taking an image of the display screen itself or markers provided around the display screen, based on which the position on the display screen being pointed by the pointing device is calculated.

As described above, the present invention can be used in an image processing program and an image processing device, aiming at, for example, allowing the user to freely adjust a display area in a virtual space.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium for use in a system, the system comprising:
 a screen;
 an input device capable of specifying screen coordinates; and
 at least one processor operatively coupled to the screen and the input device,
 the non-transitory computer-readable medium storage storing instructions for being executed by the at least one processor, the instructions being stored comprising:
  first instructions to display, on the screen, a display area representing at least a portion of a virtual space;
  second instructions to determine whether screen coordinates have been specified by the input device; and
  third instructions configured to perform the following:
   in a case no screen coordinates have been specified, converting between virtual space coordinates and screen coordinates to set the display area based on a position of an object in the virtual space;
   in a case where screen coordinates have been specified and satisfy a predetermined condition, set the display area based on the screen coordinates; and
   in a case where screen coordinates were previously specified but no longer are specified by the input device, converting between virtual space coordinates and screen coordinates to gradually move the display area towards the position of the object in the virtual space.

2. The non-transitory computer-readable storage medium according to claim 1, wherein:
 in the case where no screen coordinates are specified, the third instructions set the display area to a first position based on the position of the object in the virtual space;
 in the case where screen coordinates have been specified and satisfy the predetermined condition, the third instructions set the display area to a second position, different from the first position, based on the specified coordinates; and
 in the case where screen coordinates were previously specified but no longer are specified, the third instructions return the display area from the second position to the first position.

3. The non-transitory computer-readable storage medium according to claim 1, wherein in the case where screen coordinates have been specified and satisfy a predetermined condition, the third instructions set the display area so that the object will not be outside the screen after having been set.

4. The non-transitory computer-readable storage medium according to claim 3, wherein in the case where the screen coordinates have been specified and satisfy the predetermined condition, the third instructions calculate a movement vector for moving the display area, and set an upper limit to a movement amount of the display area.

5. The non-transitory computer-readable storage medium according to claim 1, wherein in the case where the screen coordinates have been specified and satisfy the predetermined condition, the third instructions move the display area gradually to a position in the virtual space corresponding to the specified screen coordinates.

6. The non-transitory computer-readable storage medium according to claim 1, wherein in the in the case where no screen coordinates have been specified, the third instructions set the display area such that the object is located substantially at the center of the display area.

7. The non-transitory computer-readable storage medium according to claim 1, wherein in the case where screen coordinates have been specified and satisfy the predetermined condition, the display area is gradually moved along a movement vector calculated based on the position of an object in the virtual space and the specified screen coordinates.

8. The non-transitory computer-readable storage medium according to claim 1, wherein in the case where screen coordinates have been specified and satisfy the predetermined condition, the display area is gradually moved along a movement vector calculated based on a reference point in the virtual space and the specified screen coordinates.

9. The non-transitory computer-readable storage medium according to claim 8, wherein the reference point is a point in the virtual space displayed on the screen when the screen coordinates are specified.

10. The non-transitory computer-readable storage medium according to claim 8, wherein the reference point is a point in the virtual space corresponding to the center of the screen when the screen coordinates are specified.

11. The non-transitory computer-readable storage medium according to claim 8, wherein the reference point is a point in the virtual space corresponding to the position of the object when the screen coordinates are specified.

12. The non-transitory computer-readable storage medium according to claim 1, wherein the predetermined condition is that the specified screen coordinates are different from previously specified screen coordinates.

13. The non-transitory computer-readable storage medium according to claim 1, wherein in the case where the screen coordinates have been specified and satisfy the predetermined condition, the third instructions move the display area gradually based on the specified screen coordinates.

14. The non-transitory computer-readable storage medium according to claim 1, wherein in the case no screen coordinates have been specified by the input device, the third instructions set the display area such that the object is located substantially at the center of the display area at least either in the vertical direction or in the transverse direction.

15. An image processing device comprising:
a screen;
an input device capable of specifying a screen coordinate on the screen; and
at least one processor operatively coupled to the input device, and configured to:
 display, on the screen, a display area representing at least a portion of a virtual space;
 determine whether a screen coordinate has been specified by the input device;
 in a case no screen coordinate has been specified, converting between virtual space coordinates and screen coordinates to set the display area based on a position of the object in the virtual space;
 in a case where a screen coordinate has been specified and satisfies a predetermined condition, set the display area based on the screen coordinate; and
 in a case where a screen coordinate was previously specified by the input device but no longer is specified by the input device, converting between virtual space coordinates and screen coordinates to gradually move the display area towards the position of the object in the virtual space.

16. An image processing system including at least one processor configured to perform operations comprising:
display, on a screen, a display area representing at least a portion of a virtual space;
determine whether a screen coordinate on the screen has been specified by an input device;
in a case no screen coordinate has been specified, convert between a virtual space coordinate and a screen coordinate to set the display area, based on a position of an object in the virtual space;
in a case where a screen coordinate has been specified and satisfies a predetermined condition, set the display area based on the screen coordinate; and
in a case where a screen coordinate was previously specified by the input device but no longer is specified by the input device, convert between a virtual space coordinate and a screen coordinate and gradually move the display area towards the position of the object in the virtual space.

17. An image processing method executed by a computer of an image processing device, the image processing device comprising an input device capable of specifying a coordinate on a screen, the image processing method comprising:
displaying, on the screen, a display area representing at least a portion of a virtual space;
determining whether a screen coordinate has been specified by the input device;
in a case no screen coordinate has been specified, converting between a virtual space coordinate and a screen coordinate and setting the display area based on a position of an object in the virtual space;
in a case where a screen coordinate has been specified and satisfies a predetermined condition, setting the display area based on the screen coordinate; and
in a case where a screen coordinate was previously specified by the input device but no longer is specified by the input device, converting between a virtual space coordinate and a screen coordinate and gradually moving the display area towards the position of the object in the virtual space.

* * * * *